(12) United States Patent
Ronning

(10) Patent No.: US 12,383,875 B2
(45) Date of Patent: Aug. 12, 2025

(54) STATIC MIXER

(71) Applicant: RE MIXERS, INC, Madison, WI (US)

(72) Inventor: Eric Adam Ronning, Madison, WI (US)

(73) Assignee: Re Mixers, Inc, Madison, WI (US)

( * ) Notice: Subject to any disclaimer, the term of this patent is extended or adjusted under 35 U.S.C. 154(b) by 660 days.

(21) Appl. No.: 17/770,698

(22) PCT Filed: Oct. 21, 2020

(86) PCT No.: PCT/US2020/056706
§ 371 (c)(1),
(2) Date: Apr. 21, 2022

(87) PCT Pub. No.: WO2021/081122
PCT Pub. Date: Apr. 29, 2021

(65) Prior Publication Data
US 2022/0410092 A1 Dec. 29, 2022

Related U.S. Application Data

(60) Provisional application No. 62/924,609, filed on Oct. 22, 2019, provisional application No. 62/924,170, filed on Oct. 21, 2019.

(51) Int. Cl.
*B01F 25/432* (2022.01)
(52) U.S. Cl.
CPC ............................... *B01F 25/4321* (2022.01)
(58) Field of Classification Search
CPC ............... B01F 25/431; B01F 25/4313; B01F 25/432; B01F 25/4321
See application file for complete search history.

(56) References Cited

U.S. PATENT DOCUMENTS

| 1,496,896 | A | | 6/1924 | Laffoon |
| 2,085,132 | A | | 6/1937 | Underwood |
| 3,195,865 | A | | 7/1965 | Harder |
| 3,404,869 | A | | 10/1968 | Harder |
| 3,406,947 | A | * | 10/1968 | Harder ............... B01F 25/4321 366/337 |

(Continued)

FOREIGN PATENT DOCUMENTS

| BE | 718935 | 2/1969 |
| CN | 1720094 | 1/2006 |

(Continued)

OTHER PUBLICATIONS

Supplementary European Search Report issued Oct. 31, 2023 for corresponding European Application No. 20880159.7 (3 pages).

(Continued)

*Primary Examiner* — Marc C Howell
(74) *Attorney, Agent, or Firm* — CASIMIR JONES, S.C.; Brian F. Bradley

(57) ABSTRACT

A static mixer including a first inlet channel, a second inlet channel, and a first dividing wall between the first inlet channel and the second inlet channel. The static mixer further includes a first outlet channel aligned with the first inlet channel along a first axis and a second outlet channel aligned with the second inlet channel along a second axis. The static mixer further includes a fin extending from the dividing wall.

20 Claims, 9 Drawing Sheets

(56) References Cited

U.S. PATENT DOCUMENTS

| | | |
|---|---|---|
| 3,643,927 A | 2/1972 | Crouch |
| 3,647,187 A | 3/1972 | Dannewitz et al. |
| 3,860,217 A | 1/1975 | Grout |
| 3,893,654 A | 7/1975 | Miura et al. |
| 4,032,114 A | 6/1977 | Kolm |
| 4,053,141 A | 10/1977 | Gussefeld |
| 4,072,296 A | 2/1978 | Doom |
| 4,093,188 A | 6/1978 | Horner |
| 4,112,520 A | 9/1978 | Gilmore |
| 4,145,520 A | 3/1979 | Feltgen et al. |
| 4,363,552 A | 12/1982 | Considine |
| 4,747,697 A | 5/1988 | Kojima |
| 4,801,008 A | 1/1989 | Rich |
| 4,848,920 A | 7/1989 | Heathe et al. |
| 5,425,581 A | 6/1995 | Palm |
| 5,489,153 A | 2/1996 | Berner et al. |
| 5,620,252 A | 4/1997 | Maurer |
| 5,688,047 A | 11/1997 | Signer |
| 5,851,067 A | 12/1998 | Fleischli et al. |
| 5,971,603 A | 10/1999 | Davis et al. |
| RE36,969 E | 11/2000 | Streiff et al. |
| 6,412,975 B1 | 7/2002 | Schuchardt et al. |
| 6,431,528 B1 | 8/2002 | Kojima |
| 6,467,949 B1 | 10/2002 | Reeder et al. |
| 6,550,960 B2 | 4/2003 | Catalfamo et al. |
| 6,553,755 B2 | 4/2003 | Homann et al. |
| 6,575,617 B2 | 6/2003 | Fleischli et al. |
| 6,595,679 B2 | 7/2003 | Schuchardt |
| 6,599,008 B2 | 7/2003 | Heusser et al. |
| 6,623,155 B1 | 9/2003 | Baron |
| 6,637,928 B2 | 10/2003 | Schuchardt |
| 6,676,286 B2 | 1/2004 | Grutter et al. |
| 6,769,801 B1 | 8/2004 | Maurer |
| 6,773,156 B2 | 8/2004 | Henning |
| 6,830,370 B1 | 12/2004 | Uematsu |
| 6,899,453 B2 | 5/2005 | Koch et al. |
| 7,198,400 B2 | 4/2007 | Unterlander et al. |
| 7,316,503 B2 | 1/2008 | Mathys et al. |
| 7,322,740 B2 | 1/2008 | Heusser et al. |
| 7,390,121 B2 | 6/2008 | Jahn et al. |
| 7,438,464 B2 | 10/2008 | Moser |
| 7,793,494 B2 | 9/2010 | Wirth et al. |
| D625,771 S | 10/2010 | Kojima |
| 7,841,765 B2 | 11/2010 | Keller |
| 7,985,020 B2 | 7/2011 | Pappalardo |
| 8,061,890 B2 | 11/2011 | Suhner |
| 8,083,397 B2 * | 12/2011 | Pappalardo ............ B01F 25/432 366/337 |
| 8,684,593 B2 | 4/2014 | Moser |
| 8,696,193 B2 | 4/2014 | Herbstritt |
| 8,753,006 B2 | 6/2014 | Habibi-Naimi |
| 8,936,391 B2 | 1/2015 | Stoeckli et al. |
| 9,003,771 B2 | 4/2015 | Peters et al. |
| 9,046,115 B1 * | 6/2015 | England ............... B01F 25/4316 |
| 9,452,371 B2 | 9/2016 | Al. |
| 2003/0048694 A1 * | 3/2003 | Horner ................ B01F 25/4321 366/337 |
| 2008/0038425 A1 | 2/2008 | Wilken |
| 2008/0232191 A1 | 9/2008 | Keller |
| 2009/0122638 A1 | 5/2009 | Sato et al. |
| 2010/0260009 A1 | 10/2010 | Kingsford |
| 2013/0003494 A1 | 1/2013 | Kirk |
| 2013/0119158 A1 * | 5/2013 | Hiemer .................... B05B 7/04 239/432 |
| 2016/0236161 A1 | 8/2016 | Pappalardo |
| 2017/0120206 A1 * | 5/2017 | Hiemer ............... B01F 25/4321 |
| 2017/0320028 A1 * | 11/2017 | Ronning ............... B01F 35/522 |
| 2018/0280900 A1 * | 10/2018 | Tucker ................ B01F 25/4321 |

FOREIGN PATENT DOCUMENTS

| | | |
|---|---|---|
| EP | 1153651 | 10/2005 |
| EP | 1125626 | 11/2005 |
| EP | 1437173 | 1/2006 |
| EP | 2058048 | 5/2009 |
| EP | 2301656 | 3/2011 |
| EP | 1712751 | 7/2012 |
| JP | 62-269733 | 11/1987 |
| JP | 2000-354749 | 12/2000 |
| JP | 2004-188415 | 7/2004 |
| JP | 2009-113012 | 5/2009 |
| JP | 53-139672 | 3/2014 |
| KR | 101379418 | 3/2014 |
| WO | WO8900076 | 1/1989 |
| WO | WO2007110316 | 10/2007 |
| WO | WO2011/119820 | 9/2011 |
| WO | WO2012116873 | 9/2012 |
| WO | WO 2017/083737 | 5/2017 |

OTHER PUBLICATIONS

Extended European Search Report issued Jun. 14, 2019 for corresponding European Application No. 16865144.6 (7 pages).

Ronning, "140501 ME351 Presentation Packet 1," May 8, 2014, 7 pages.

Ronning, "The PEC Mixer, A physical realization of Erwin's Law," Jan. 24, 2013, 28 pages.

Ronning et al., "Erwin Mixer," Oct. 8, 2013, 61 pages.

Indian Office Action dated Nov. 26, 2020 for corresponding Indian Application No. 201817017884 (9 pages).

Japan Office Action issued Sep. 25, 2020 for corresponding Japanese Application No. 2018-544774 (12 pages).

Chinese Office Action dated Sep. 17, 2020 for corresponding Chinese Application No. 201680073041.0 (16 pages).

International Search Report and Written Opinion, International Patent Application No. PCT/US2020/056706, Mailed Jan. 26, 2021, 18 pages.

\* cited by examiner

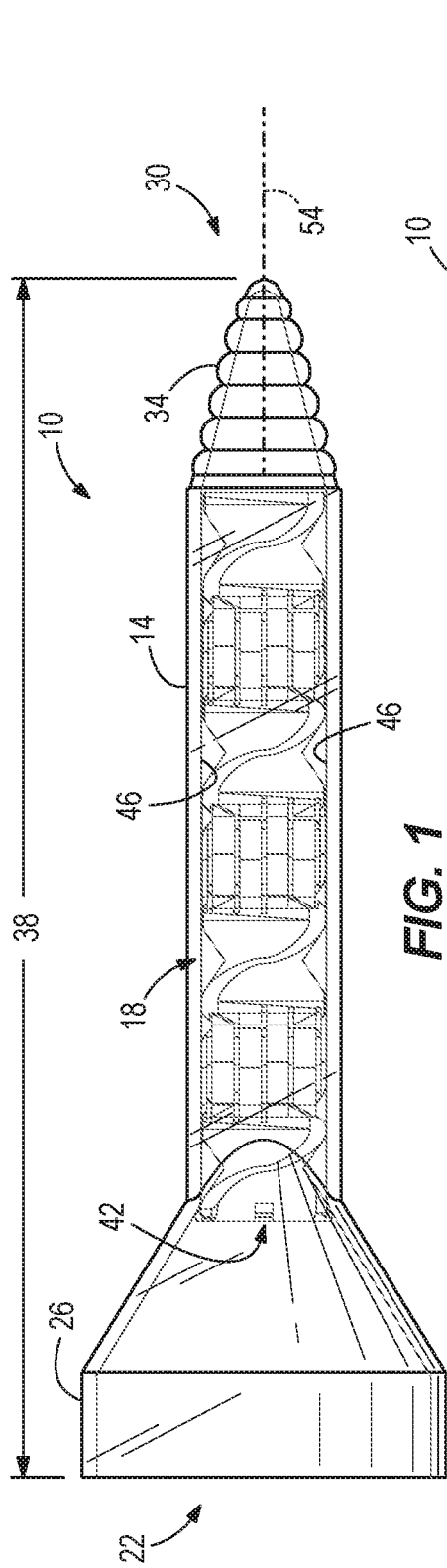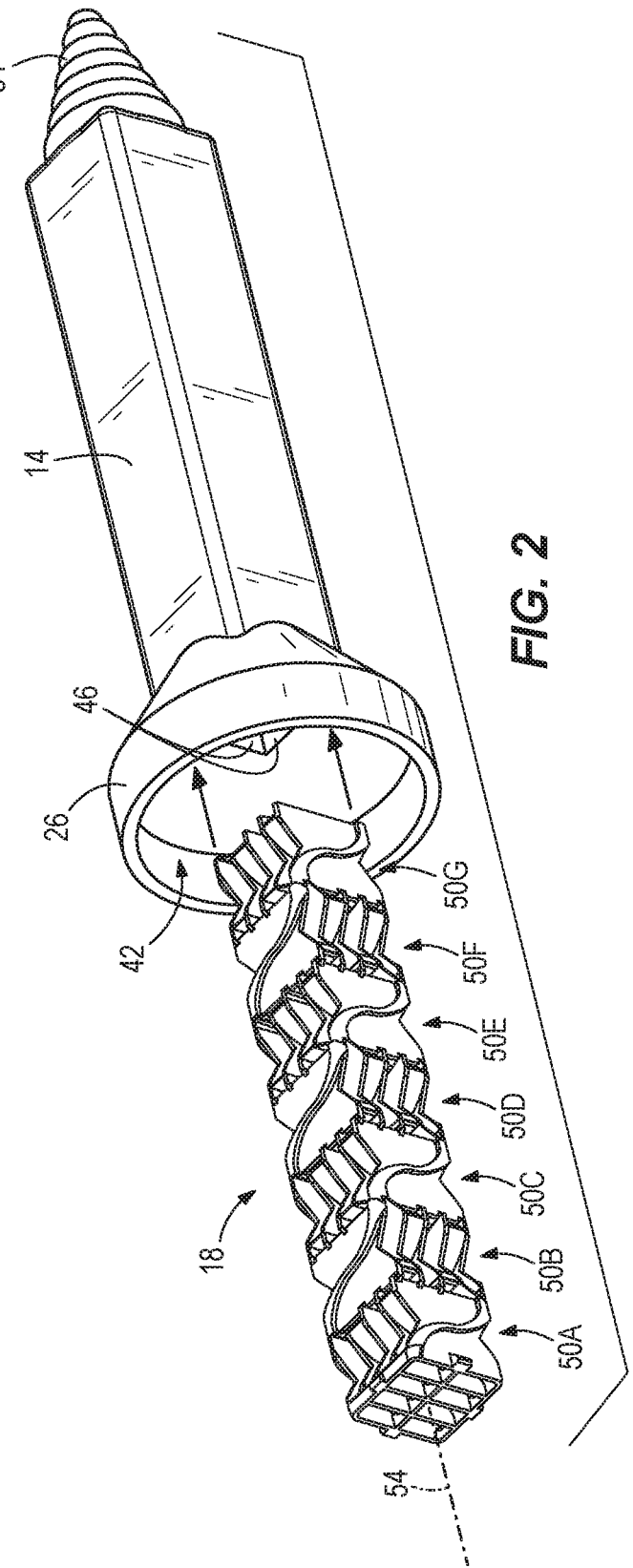

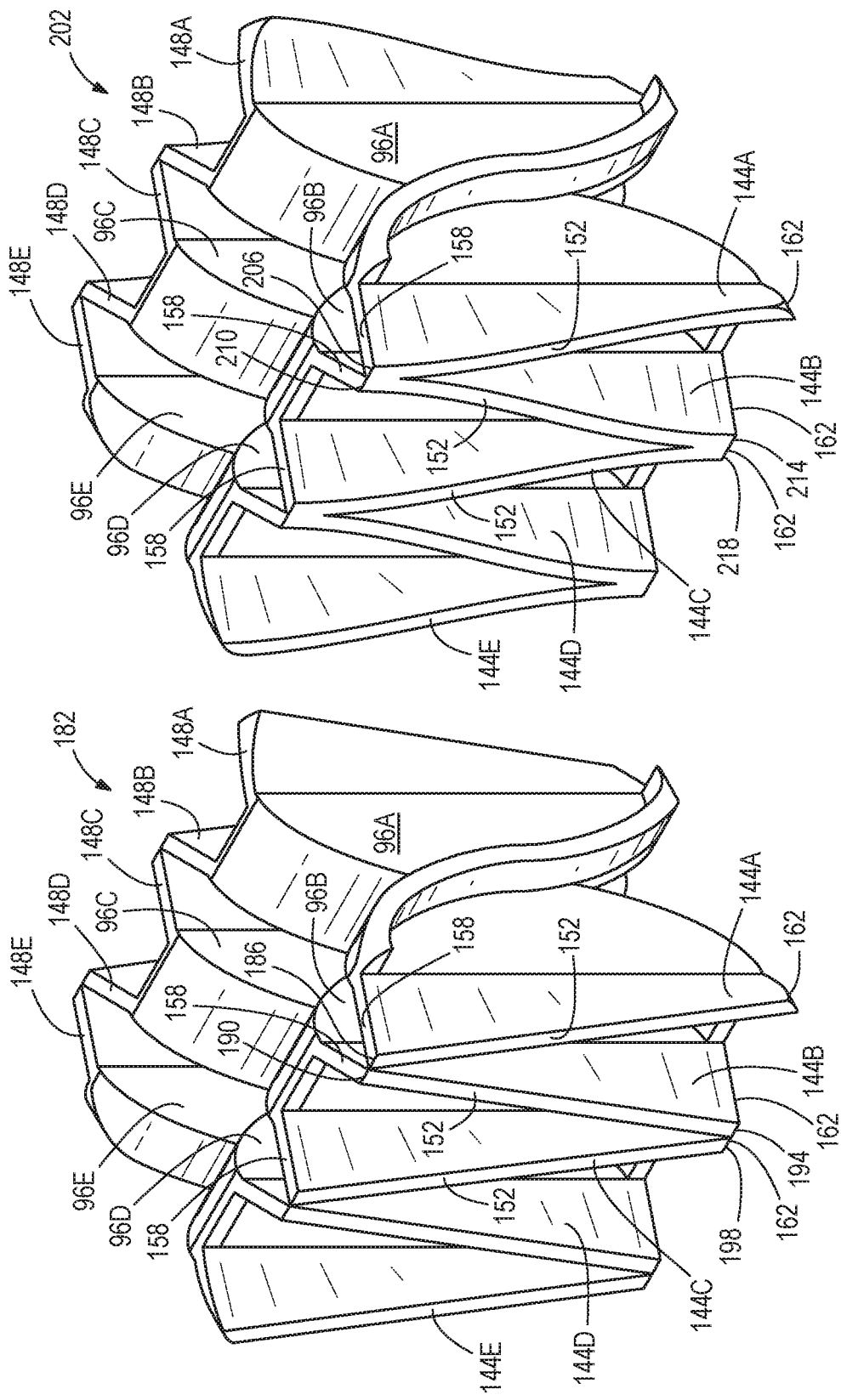

STATIC MIXER

CROSS-REFERENCE TO RELATED APPLICATIONS

This application is a 371 U.S. National Phase Entry of pending International Application No. PCT/US2020/056706, filed Oct. 21.2020, which claims priority to U.S. Provisional Patent Application No. 62/924,609 filed on Oct. 22, 2019 and U.S. Provisional Patent Application No. 62/924,170 filed on Oct. 21, 2019, the entire contents of which are incorporated herein by reference.

FIELD OF THE INVENTION

The present disclosure relates to a static mixer.

BACKGROUND OF THE INVENTION

A number of conventional motionless (i.e., static) mixer types exist that implement a similar general principle to mix fluids together. Specifically, fluids are mixed together by dividing and recombining the fluids in an overlapping manner. This action is achieved by forcing the fluid over a series of baffles of alternating geometry. Such division and recombination cause the layers of the fluids being mixed to diffuse past one another, eventually resulting in a generally homogenous mixture of the fluids. However, conventional mixers often result in a streaking phenomenon with streaks of fluid that pass through the mixer essentially unmixed.

Furthermore, to achieve adequate mixing (i.e., a generally homogenous mixture) additional baffles must be placed in the conventional mixer to thoroughly diffuse the material, thus increasing the mixer's overall length. Such an increase in mixer length is unacceptable in many motionless mixer applications, such as handheld mixer-dispensers. In addition, longer mixers generally have a higher retained volume and higher amounts of waste material as a result. A large amount of waste material is particularly undesirable when dealing with expensive materials. In other words, the length of the conventional static mixer is large, resulting in a large amount of wasted material that must pass through the static mixer before any mixed output is usable.

SUMMARY OF THE INVENTION

The disclosure provides, in one aspect, a static mixer including a first inlet channel, a second inlet channel, and a first dividing wall between the first inlet channel and the second inlet channel. The static mixer further includes a first outlet channel aligned with the first inlet channel along a first axis and a second outlet channel aligned with the second inlet channel along a second axis. The static mixer further includes a fin extending from the dividing wall.

The disclosure provides, in another aspect, a static mixer including a first channel, a second channel, a third channel, and a first dividing wall positioned between the first channel and the second channel. The static mixer further includes a second dividing wall positioned between the second channel and the third channel. A first fin extends from the first dividing wall and a second fin extends from the second dividing wall.

The disclosure provides, in another aspect, a static mixer including a first channel, a second channel, a third channel, and a first dividing wall between the first channel and the second channel. The static mixer further includes a second dividing wall between the second channel and the third channel. A first opening is formed in the first dividing wall and in fluid communication with the first channel, and a second opening is formed in the second dividing wall and in fluid communication with the second channel. The first dividing wall includes a first flange at least partially defining the first opening and the second dividing wall includes a second flange at least partially defining the second opening. The first opening and the second opening are not the same size.

The disclosure provides, in another aspect, a static mixer including a first channel at least partially defined by a guide wall, a second channel, and a dividing wall positioned between the first channel and the second channel. The guide wall has a first thickness and a second thickness different than the first thickness.

The disclosure provides, in another aspect, a static mixer including a first channel defining a first dimension, a second channel defining a second dimension, and a third channel. The static mixer further includes a first dividing wall between the first channel and the second channel, and a second dividing wall between the second channel and the third channel. The first dimension is less than half the second dimension.

Other aspects of the disclosure will become apparent by consideration of the detailed description and accompanying drawings.

BRIEF DESCRIPTION OF THE DRAWINGS

FIG. 1 is a side view of a static mixer according to an aspect of the disclosure.

FIG. 2 is an exploded view of the static mixer of FIG. 2 illustrating a mixer assembly.

FIG. 9 is a perspective view of a mixer element according to another aspect of the disclosure.

FIG. 10 is a perspective view of a mixer element according to another aspect of the disclosure.

Figure 3:
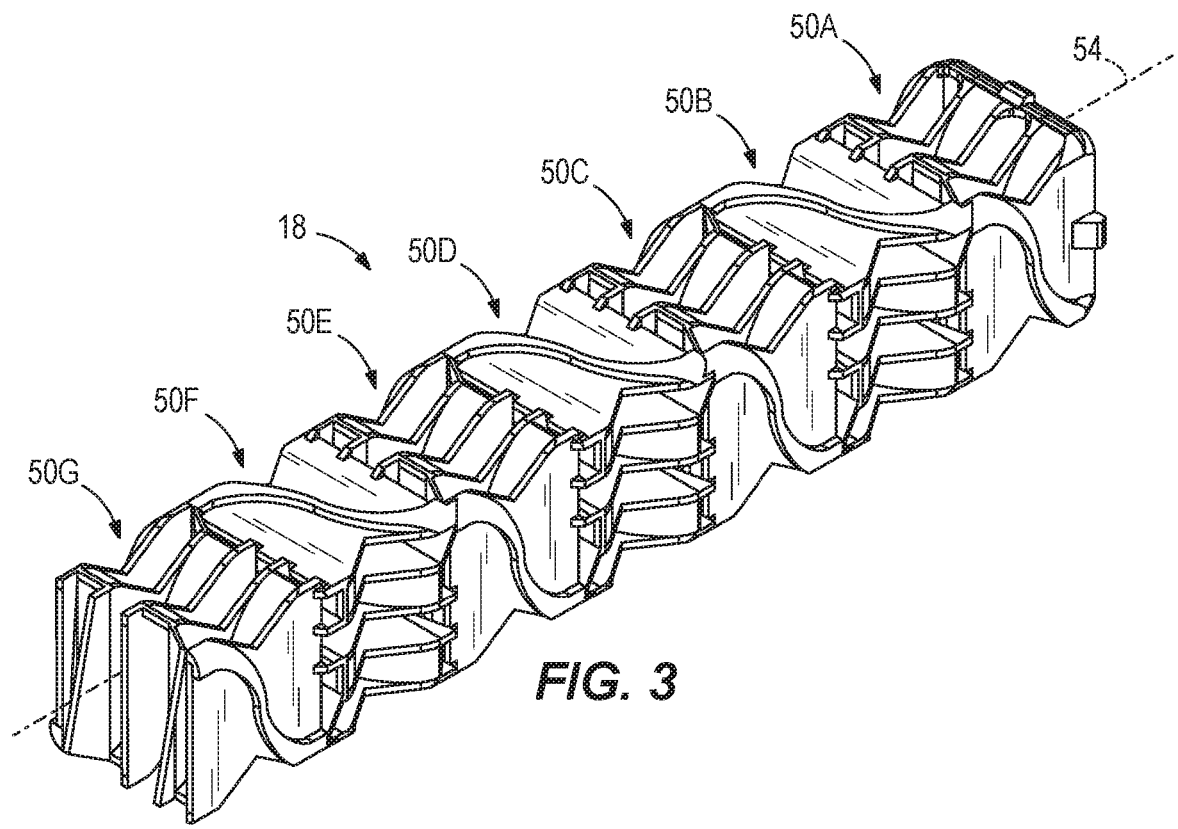
FIG. 3 is a perspective view of mixer assembly of FIG. 2.

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

With reference to FIGS. 1 and 2, a static mixer 10 according to one embodiment of the invention is illustrated.

The static mixer 10 includes a housing 14 and a mixer assembly 18 received within the housing 14. Specifically, the housing 14 includes an inlet end 22 formed with an inlet socket 26 and an outlet end 30 formed with a nozzle 34. The inlet end 22 and the outlet end 30 define a material flow path that extends therebetween. In other words, the inlet end 22 is upstream in the material flow path from the outlet end 30. In the illustrated embodiment, the inlet socket 26 is formed as a bell-type inlet, but in alternative embodiments the inlet socket 26 may be formed as a bayonet-type inlet, for example. Other inlet configurations known to those of ordinary skill in the art may also be used.

With continued reference to FIG. 2, the static mixer 10 includes an overall length 38, which is smaller than the overall length of conventional static mixers. As explained in greater detail below, the static mixer 10 is able to create a more homogenous mixture (i.e., improved results) with a shorter overall length (i.e., less wasted material) compared to conventional mixers. A static mixer is disclosed in U.S. patent application Ser. No. 15/526,556, the entire contents of which are incorporated herein by reference.

With reference to FIG. 2, the mixer assembly 18 is received within a chamber 42 (i.e., channel) defined by the housing 14. In the illustrated embodiment, the chamber 42 is square-shaped with four chamber walls 46. In alternative embodiments, the chamber 42 may be circular-shaped to correspond to a circular-shaped mixer element. The mixer assembly 18 includes seven mixer elements 50A, 50B, 50C, 50D, 50E, 50F, 50G. As explained in greater detail below, two or more separate fluids (e.g., gasses, liquids, and/or fluidized solids) enter the inlet end 12 of the housing 14, pass through the mixer assembly 18 and exit through the outlet end 30 as a substantially homogenous mixture.

Figure 4:
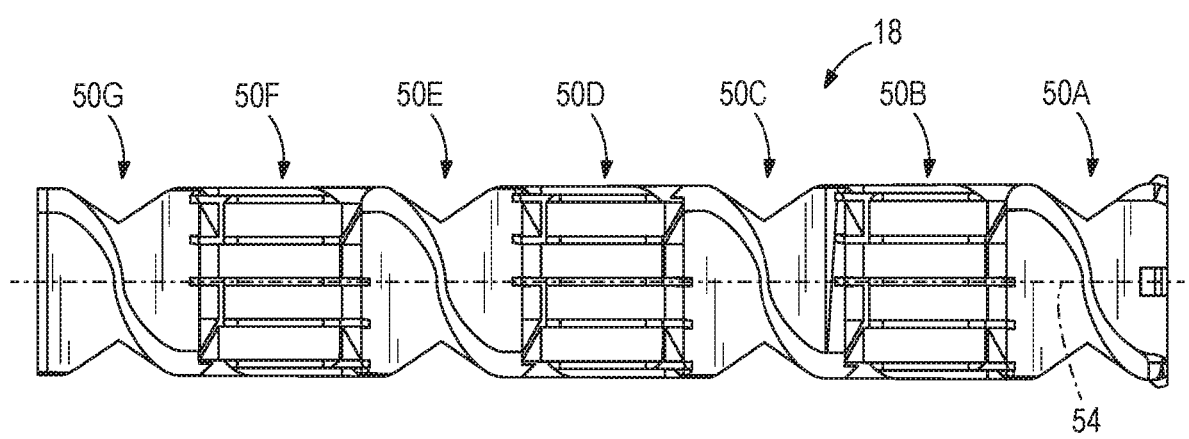
FIG. 4 is a side view of the mixer assembly of FIG. 3.
Figure 12:
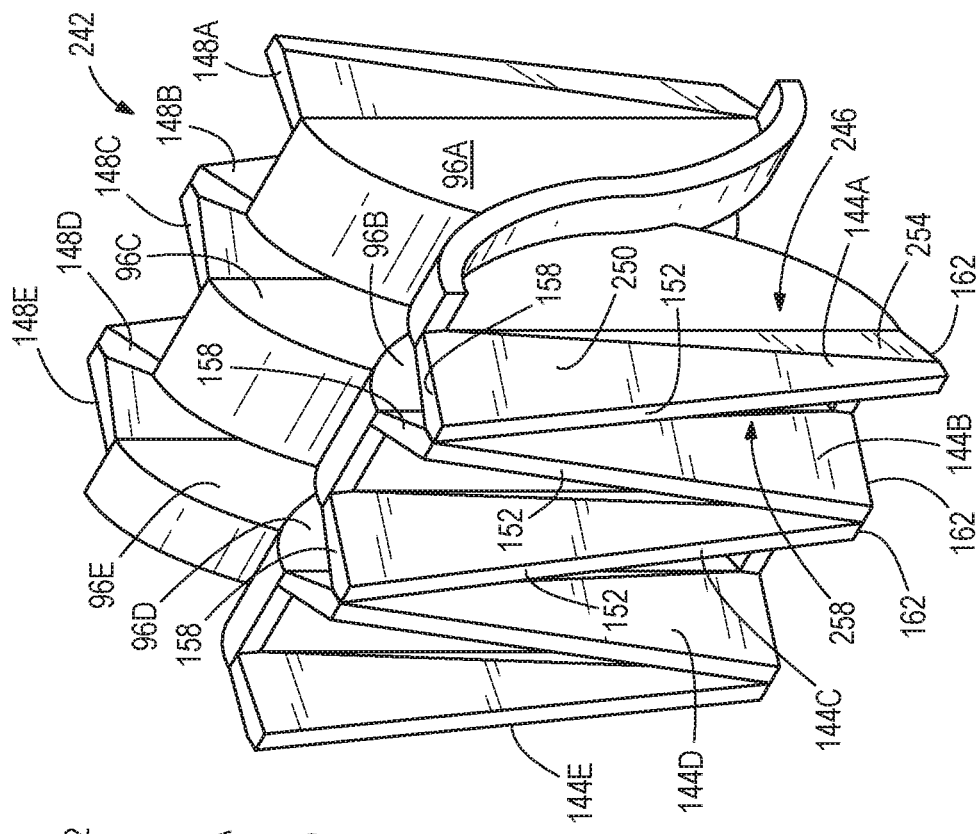
FIG. 12 is a perspective view of a mixer element according to another aspect of the disclosure.
Figure 11:
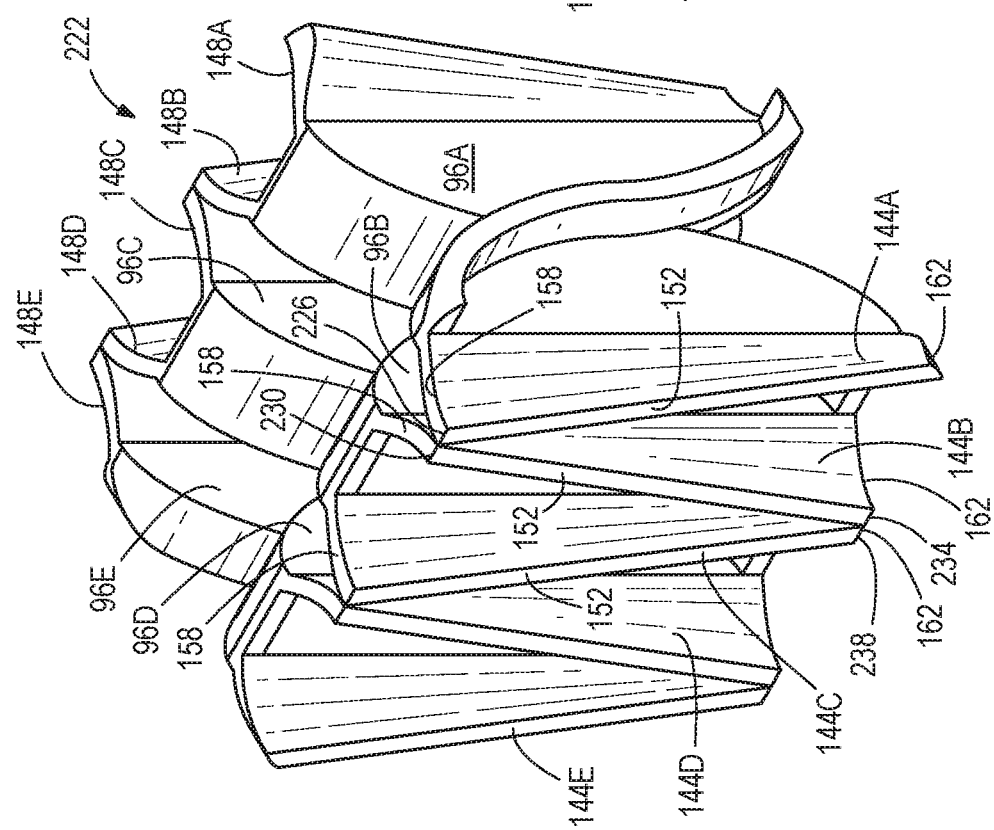
FIG. 11 is a perspective view of a mixer element according to another aspect of the disclosure.
Figure 13:
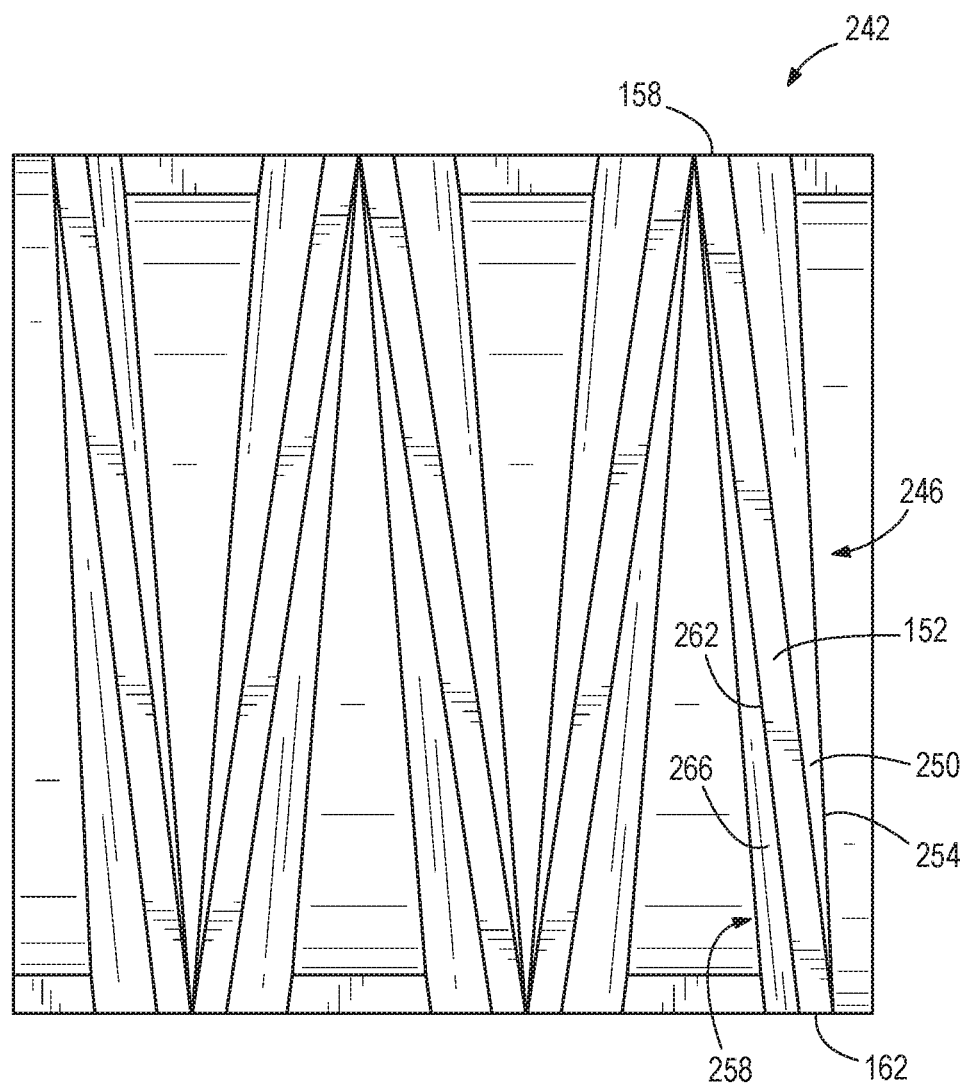
FIG. 13 is a front view of the mixer element of FIG. 12.

The mixer assembly 18 can be formed by the combination of mixer elements with various geometries in various orientations. The mixer assembly 18 is illustrated with seven mixer elements 50A-50G and are referenced sequentially in a downstream direction. The second mixer element 50B is positioned downstream in the material flow path from the first mixer element 50A. The third mixer element 50C is positioned downstream in the material flow path from the second mixer element 50B. The fourth mixer element 50D is positioned downstream in the material flow path from the third mixer element 50C. In the illustrated embodiment, the seven mixer elements 50A-50D are formed as a single integral unit (i.e., formed with an injection molding process or 3D printing process). In some embodiments, the mixer assembly is formed by a plurality of mixer elements with the same, or similar, geometry. With continued reference to FIGS. 3-4, the second, third, and fourth mixer elements 50B, 50C, 50D are the same structure illustrated for the first mixer element 50A. However, the third mixer element 50C is positioned in a different orientation as the second mixer element 50B and the fourth mixer element 50D is positioned in a different orientation as the third mixer element 50C. In other words, the mixer assembly 18 defines a longitudinal axis 54 and the mixer elements 50A-50G are positioned in different orientations rotationally about the longitudinal axis 54. For example, the second mixer element 50B is oriented with a 90 degree rotation along the longitudinal axis 54 with respect to the first mixer element 50A, and the third mixer element 50C is oriented with a 90 degree rotation along the longitudinal axis 54 with respect to the second mixer element 50B. In some embodiments, mixer elements with different geometries are combined to formed a mixer assembly. Details and aspects of various mixer elements (e.g., FIGS. 5-8; FIG. 9; FIG. 10; FIG. 11; FIGS. 12-13; and FIGS. 14-15) are discussed below.

With reference to FIGS. 5-8, a mixer element 58 includes six inlet channels 62A, 62B, 62C, 62D, 62E, 62F and six outlet channels 68A, 68B, 68C, 68D, 68E, 68F. The inlet channels 62A-62F are upstream in a material flow path of the outlet channels 68A-68F. Each of the outlet channels 68A-68F is aligned with a corresponding inlet channel 62A-62F along a channel axis 72A, 72B, 72C, 72D, 72E, 72F. For example, the first outlet channel 68A is aligned with the first inlet channel 62A along the first axis 72A, and second outlet channel 68B is aligned with the second inlet channel 62B along the second axis 72B. In addition, third outlet channel 68C is aligned with the third inlet channel 62C along the third axis 72C, and so forth. The first axis 72A is approximately parallel with the second axis 72B. In the mixer element 58 of FIGS. 5-8, the axes 72A-72F are parallel with each other. The mixer element 58 is substantially the same as mixer elements 50A-50G illustrated in the mixer assembly 18.

Figure 5:
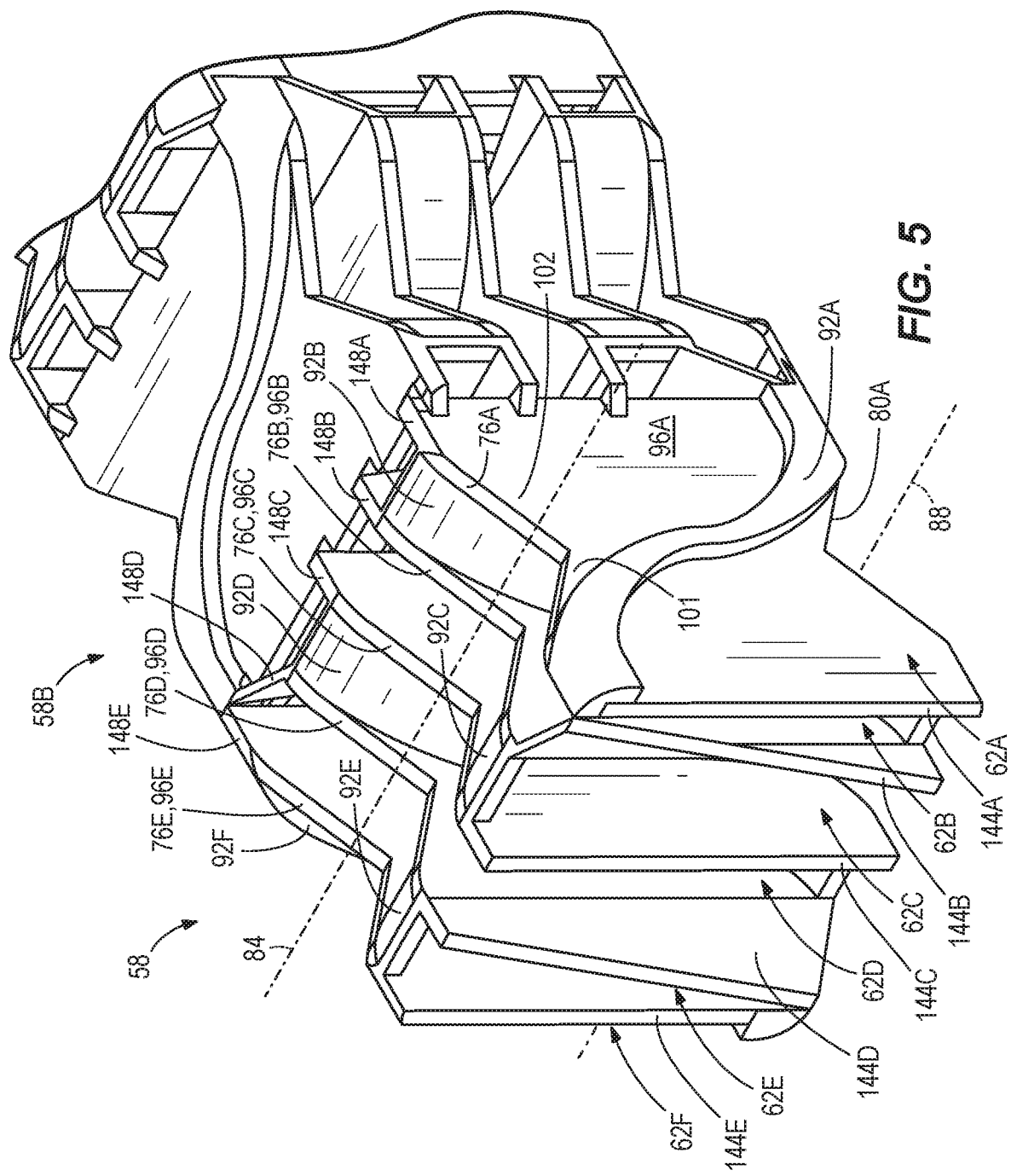
FIG. 5 is an enlarged partial perspective view of a mixer assembly according to an aspect of the disclosure.

With continued reference to FIG. 5, the mixer element 58 further includes a first set of openings 76A, 76B, 76C, 76D, 76E and a second set of openings 80A, 80B, 80C, 80D, 80E. With reference to FIG. 5 and its frame of reference, the first set of openings 76A-76E are upper openings and the second set of openings 80A-80E are lower openings. In particular, the five openings 76A-76E are positioned between the inlet channels 62B, 62D, 62F and the outlet channels 68A, 68C, 68E. Similarly, the five openings 80A-80E are positioned between the inlet channels 62A, 62C, 62E and the outlet channels 68B, 68D, 68F. Specifically, the first opening 76A is between the second inlet channel 62B and the first outlet channel 68A, and the second opening 76B is between the second inlet channel 62B and the third outlet channel 68C. In other words, the openings 76A-76E and 80A-80E place an inlet channel 62A-62F in fluid communication with an adjacent one of the outlet channels 68A-68F (i.e., an outlet channel next to, but not aligned with the inlet channel).

Figure 7:
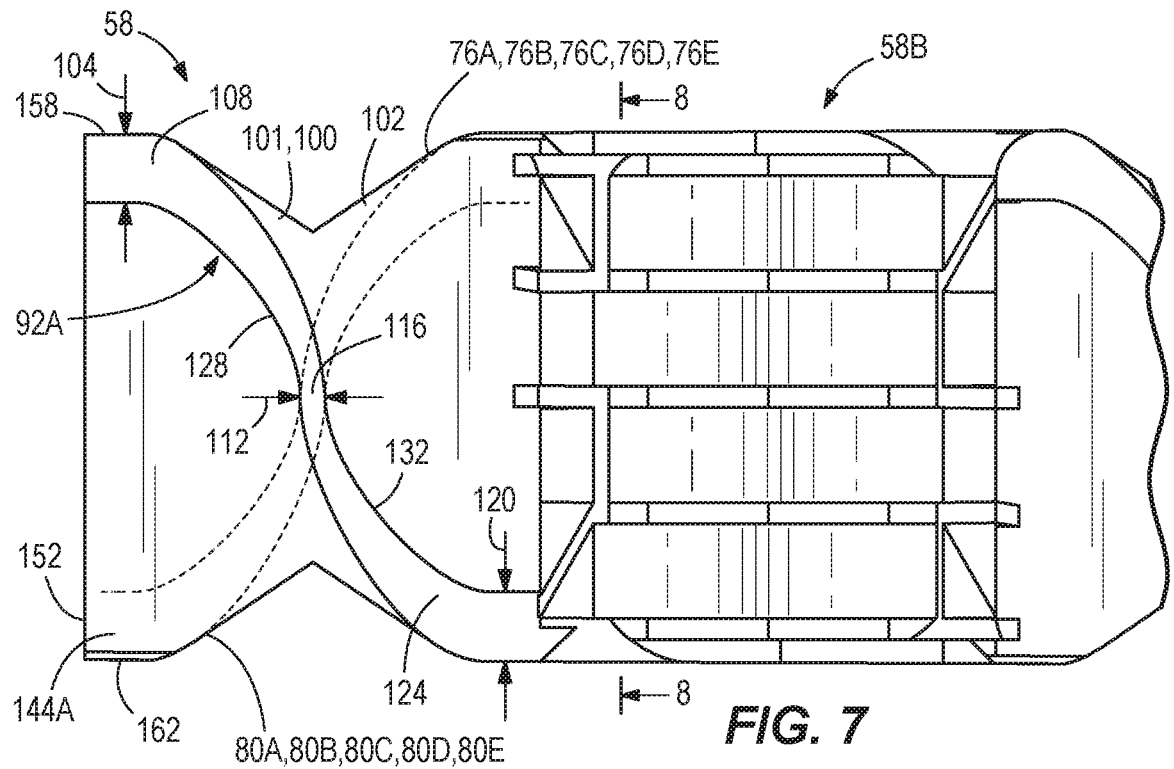
FIG. 7 is an enlarged partial top view of the mixer assembly of FIG. 3.

With reference to FIGS. 5 and 7, the upper openings 76A-76F are all aligned along an upper opening axis 84, and the lower opening 80A-80E are all aligned along a lower opening axis 88. In other words, the upper opening axis 84 passes through a centroid of each of the upper openings 76A-76F. Likewise, the lower opening axis 88 passes through a centroid of each of the lower openings 80A-80E. In the embodiment illustrated, the first set of openings 76A-76F are all the same size and the second set of openings 80A-80F are all the same size. In addition, in the illustrated embodiment, the first set of openings 76A-76F are the same size as the second set of openings 80A-80F. In other embodiments, the openings 76A-76F and 80A-80F are different sizes or different shapes.

With continued reference to FIGS. 5-8, the mixer element 58 can alternatively be described as including wall segments. The mixer element 58 includes a plurality of guide walls 92A-92F and a plurality of dividing walls 96A-96E extending between the guide walls 92A-92F. Specifically, a first dividing wall 96A extends between the first guide wall 92A and the second guide wall 92B. The first inlet channel 62A is partially defined by the first guide wall 92A and the first dividing wall 96A. The first outlet channel 68A is also partially defined by the first guide wall 92A and the first dividing wall 96A. In other words, the first outlet channel 68A is positioned on an opposite side of the first guide wall 92A as the first inlet channel 62A (i.e., the first guide wall 92A separates the first inlet channel 62A and the first outlet channel 68A). When the mixer element 58 is positioned with the housing 14, the first guide wall 92A completely separates the first inlet channel 62A and the first outlet channel 68A such that the first inlet channel 62A is not in fluid communication with the first outlet channel 68A.

Figure 6:
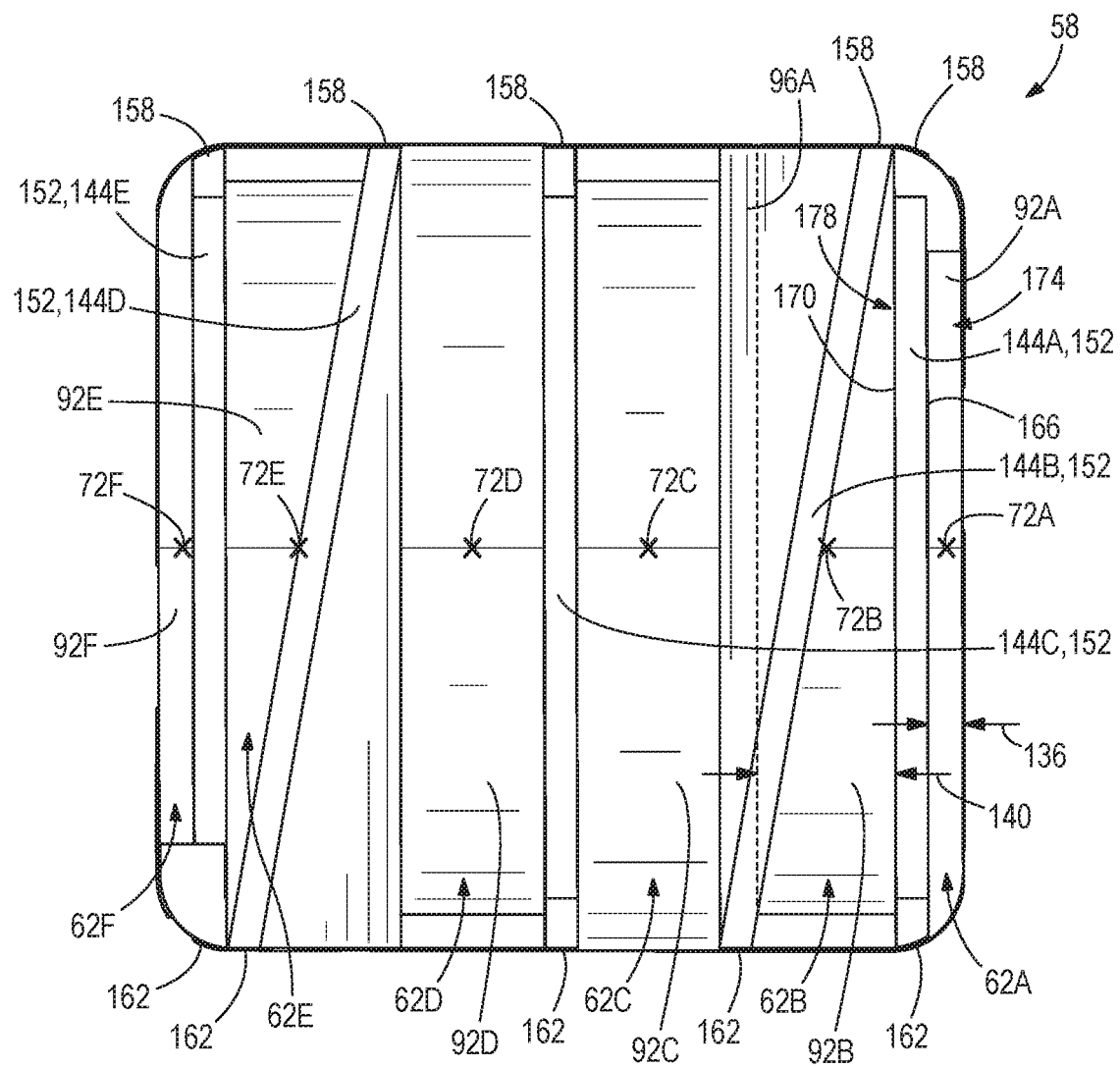
FIG. 6 is a front view of the mixer assembly of FIG. 3.

With continued reference to FIG. 5, the first opening 76A is at least partially defined by the first dividing wall 96A. The first opening 76A places the second inlet channel 62B in fluid communication with the first outlet channel 68A. The second opening 80A is also at least partially defined by the first dividing wall 96A. The second opening 80A places the first inlet channel 62A in fluid communication with the second outlet channel 68B. In the illustrated embodiment, an outer periphery of the first dividing wall 92A at least partially defines the first opening 76A and at least partially defines the second opening 80A. In the illustrated embodiment, the openings 76A-76E and 80A-80E are triangular-shaped. In some embodiments, the openings 76A-76E and 80A-80E are at least partially formed by a flange 100. In alternative embodiments, the openings 76A-76E and 80A-80E are curved (i.e., at least partially defined by an arc). With reference to FIGS. 5 and 6, the first dividing wall 96A and the second dividing wall 96B are parallel to each other. In the illustrated embodiment, each of the dividing walls 96A-96E are parallel to each other.

With reference to FIGS. 5 and 7, the first guide wall 92A is non-planar (i.e., a curved surface) and the second guide wall 92B is non-planar (i.e., a curved surface). In other words, the first guide wall 92A does not extend along a straight line (i.e., the first guide wall 92A is curve-shaped). Likewise, the second guide wall 92B does not extend along a straight line (i.e., the second guide wall 92B is curve-shaped). In the illustrated embodiment, the guide walls 92A-92F have a similar shape. In some embodiments, the guide walls 92A-92F are S-shaped. In other embodiments, the guide walls 92A-92F are sigmoid shaped.

With continued reference to FIGS. 5 and 7, the first guide wall 92A defines a variable thickness. Specifically, the first guide wall 92A has a first thickness 104 at an upstream portion 108 of the guide wall 92A and a second thickness 112 at a midstream portion 116 of the guide wall 92A. The first thickness 104 is different than the second thickness 112. In the illustrated embodiment, the first thickness 104 is larger than the second thickness 112. In other embodiments, the first thickness 104 is smaller than the second thickness 112. The guide wall 92A also defines a third thickness 120 at a downstream portion 124 of the guide wall 92A. The midstream portion 116 of the guide wall 92A is positioned between the upstream portion 108 and the downstream portion 124. In the illustrated embodiment, the upstream portion 108 extends approximately parallel to the downstream portion 124 with the midstream portion 116 extending therebetween in a non-linear manner. In some embodiments, the first thickness 104 is approximately equal to the third thickness 120. Specifically, the thickness of the guide wall 92A as used herein is the shortest distance through the guide wall 92A at any point along the guide wall 92A. In other words, the guide wall 92A includes a first surface 128 (i.e., an upstream surface) and a second surface 132 (i.e., a downstream surface). The thickness of the guide wall 92A is defined as the shortest distance from a given point on the first surface 128 to the second surface 132. Increasing guide wall thickness as the guide walls approach housing corners reduces the streaking in the resulting mixture of materials.

With reference to FIGS. 5 and 6, the first inlet channel 62A is less than half the width of the second inlet channel 62B. Specifically, the first inlet channel 62A defines a first dimension 136 (i.e., width) and the second inlet channel 62B defines a second dimension 140. The first dimension 136 is less than half the second dimension 140. As discussed above, the housing 14 surrounds the mixer element 58 and the first dimension 136 is the distance between the first dividing wall 96A and a side wall 46 of the chamber 42 in the housing 14. In other words, the first inlet channel 62A is an end channel positioned at an outer periphery of the mixer element 58 and the second inlet channel 62B is an internal channel positioned with between two adjacent channels (i.e., the first inlet channel 62A and the third inlet channel 62C). In the illustrated embodiment, the second inlet channel 62B, the third inlet channel 62C, the fourth inlet channel 62D, the fifth inlet channel 62E are approximately the same width (i.e., the second dimension 140); while the first inlet channel 62A and the sixth inlet channel 62F are approximately the same width (i.e., the first dimension 136). The first guide wall 92A partially defines the first inlet channel 62A and the first guide wall 92A extends between the first dividing wall 96A and the housing 14. The second dimension 140 is the distance between the first dividing wall 96A and the second dividing wall 96B. The second guide wall 92B partially defines the second inlet channel 62A and the second guide wall 92B extends between the first dividing wall 96A and the second dividing wall 96B. In some embodiments, the first dimension 136 is approximately 40 percent of the second dimension 140. In other embodiments, the first dimension 136 is less than approximately 40 percent of the second dimension 140. In some embodiments, the first dimension 136 may be within a range of approximately 35 percent to approximately 45 percent of the second dimension 140. Proportioning the first dimension 136 accordingly, reduces the streaking in the resulting mixture of materials.

With reference to FIG. 5, the static mixer 10 includes a plurality of fins 144A-144E, 148A-148E extending from the dividing walls 96A-96E. The fins 144A-144E (i.e., the upstream fins) extend from the upstream end of the dividing walls 96A-96E and the fins 148A-148E (i.e., the downstream fins) extend from the downstream end of the dividing walls 96A-96E. In the illustrated embodiment, the fins 144A, 144C, 144E, 148A, 148C, 148E extend co-planar with the dividing walls 96A, 96C, 96E (e.g., the fin 144A and the fin 148A are coplanar with the dividing wall 96A). In the illustrated embodiment, the fins 144B, 144D, 148B, and 148D are shaped so as to extend towards and partially block the flow of material to one of the inlet channels 62A-62F or from one of the outlet channels 68A-68F (e.g., the fin 144B extends towards and partially blocks the flow of material to the inlet channel 62A; and the fin 148B extends towards and partially blocks the flow of material from the outlet channel 68B). In other words, the fins 144B, 144D, 148B, and 148D extend at angles with respect to the dividing walls 96B, 96D and at least partially overlap with one of the inlet channels 62-62F or one of the outlet channels 68A-68F as viewed from an upstream or downstream end view (e.g., FIG. 6).

With continued reference to FIGS. 5 and 6, each of the fins 144A-144E and 148A-148E define a first edge surface 152 (i.e., a first edge), a second edge surface 158 (i.e., a second edge), and a third edge surface 162 (i.e., a third edge). The second edge surface 158 and the third edge surface 162 of each fin 144A-144E and 148A-148E are coupled one of the dividing walls 96A-96E. In the illustrated embodiment, the second edge surface 158 and the third edge surface 162 of the fin 144B, for example, are directly connected to the dividing wall 96B. The first edge surface 152 extends between the second edge surface 158 and the third edge surface 162. In the illustrated embodiment, the first edge surface 152, the second edge surface 158, and the third edge surface 162 of the fins 144A-144E and 148A-148E are linear and extend in a linear direction. In other words, the first edge surface 152 defines a linear profile and the second and third edge surfaces 158 and 162 define a linear loft. Each fin 144A-144E and 148A-148E includes a first side surface 166 and a second side surface 170 positioned opposite the first side surface 166. In other words, a first side 174 of the fin 144A is at least partially defined by the first side surface 166 and a second side 178 of the fin 144A is at least partially defined by the second side surface 170. With reference to FIG. 6 and its frame of reference, the second edge surface 158 is an upper edge of the fins 144A-144E and the third edge surface 162 is a lower edge of the fins 144A-144E.

With continued reference to FIG. 5, the first edge surfaces 166 and the second edge surfaces 158 of the fins 144A-144E and 148A-148E are linear. For example, the fin 144B extends from a terminal edge 182 of the dividing wall 96B along a linear path that at least partially defines the second edge surface 158. In other words, the second edge surface 158 extends linearly from the terminal end 182 on the dividing wall 96B to the first edge surface 166. The second edge 158 extends from the dividing wall 96B at an angle. The third edge 162 extends from the dividing wall 96B along the plane of the dividing wall 96B. In other words, the third edge surface 162 on the fin 144B is co-planar with the dividing wall 96B. In other embodiments, any one of the first edge 152, the second edge 158, or the third edge 162 are non-linear.

Figure 8:
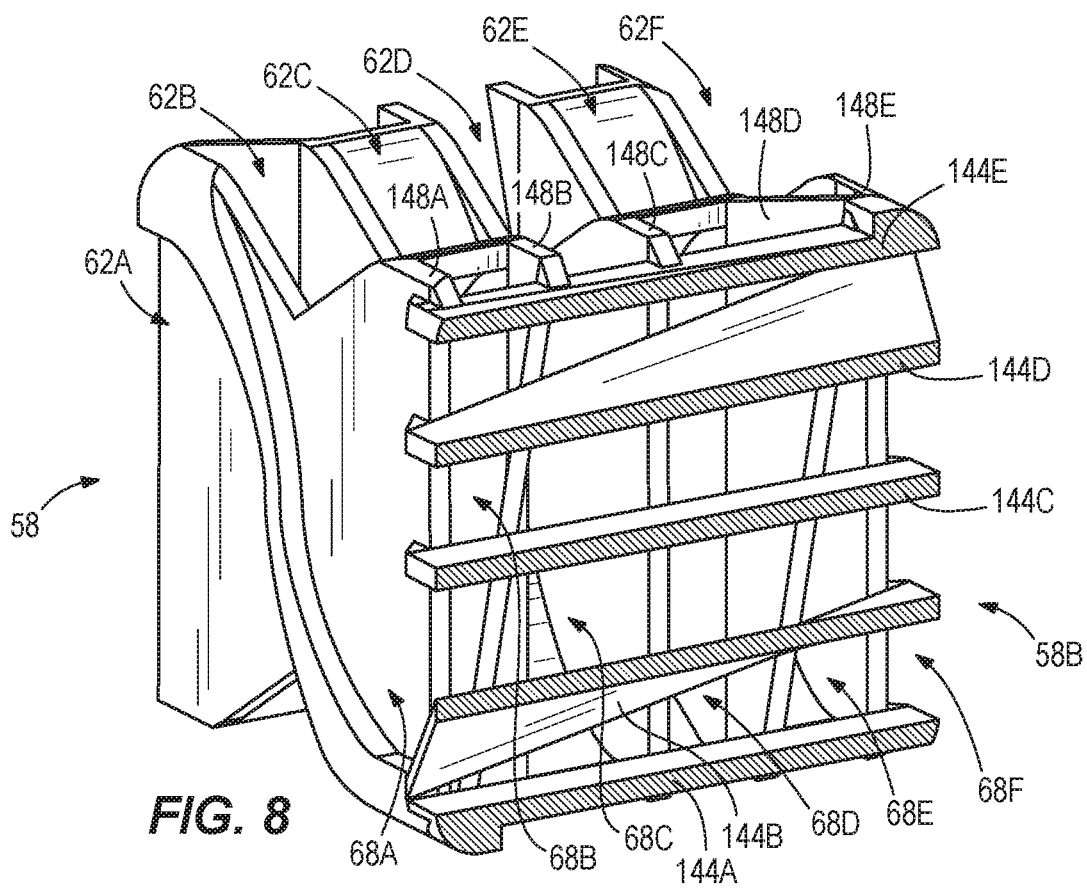
FIG. 8 is a cross-sectional view of the mixer assembly of FIG. 3, taken along lines 8-8 shown in FIG. 7.

As illustrated in FIGS. 5, 7, and 8, the downstream fins 148A-148E are coupled to upstream fins 144A-144E of another mixer element 58B. In the illustrated embodiment, the downstream mixer element 58B is the same as the upstream mixer element 58 but rotated 90 degrees. In the illustrated embodiment, each of the downstream fins 148A-148E of the mixer element 58 intersects at least two of the upstream fins 144A-144E of the adjacent mixer element 58B. In some embodiments, each downstream fin 148A-148E of the mixer element 58 intersects each of the upstream fins 144A-144E of the adjacent mixer element 58B.

In operation of the mixer element 58, material entering the inlet channels 62A-62F is guided by the guide walls 92A-92F toward the openings 76A-76E and 80A-80E. The material then passes from the inlet channels 62A-62F through the openings 76A-76E and 80A-80E to the outlet channels 68A-68F. Specifically, the material flows from an inlet channel into an adjacent outlet channel through an opening. For example, material entering the inlet channel 62A is guided by the first guide wall 92A toward the opening 80A where the material then enters the second outlet channel 68B (i.e., an outlet channel adjacent the inlet channel). As such, the first inlet channel 62A is not in fluid communication with the first outlet channel 68A. The fins 144A-144E and 148A-148E improves the overall mixing performance of the mixer element 58. For example, the fins 144A-144E and 148A-148E reduce the amount of streaking that occurs in an output of the mixer element 58. The fins 144A-144E and 148A-148E also reduce the pressure loss across the mixer element 58.

With reference to FIG. 9, a mixer element 182 similar to the mixer element 58 is illustrated with similar reference numerals from the mixer element 58 used to describe the mixer element 182. Only the differences between the mixer element 182 and the mixer element 58 are described herein. None of the fins 144A-144E and 148A-148E extend co-planar to any one of the dividing walls 96A-96E. In other words, the upstream fins 144A-144E and the downstream fins 148A-148E extend at angles with respect to the dividing walls 96A-96E. The first edge 152, the second edge 158, and the third edge 162 are linear. In other words, the fins 144A-144E and 148A-148E have both a linear profile (i.e., the first edge 152 is linear) and a linear loft (i.e., the second and third edge 158, 162 are linear). In the illustrated embodiment, a portion of the fin 144A contacts a portion of the fin 144B. Specifically, a corner 186 (i.e., the intersection of the first edge surface 152 and the second edge surface 158) on the fin 144A contacts a corner 190 (i.e., the intersection of the first edge surface 152 and the second edge surface 158) on the fin 144B. Likewise, a corner 194 (i.e., the intersection of the first edge surface 152 and the third edge surface 162) on the fin 144B contacts a corner 198 (i.e., the intersection of the first edge surface 152 and the third edge surface 162) on the fin 144C.

With reference to FIG. 10, a mixer element 202 similar to the mixer element 58 is illustrated with similar reference numerals from the mixer element 58 used to describe the mixer element 202. Only the differences between the mixer element 202 and the mixer element 58 are described herein. None of the fins 144A-144E and 148A-148E extend co-planar to any one of the dividing walls 96A-96E. In other words, the upstream fins 144A-144E and the downstream fins 148A-148E extend at angles with respect to the dividing walls 96A-96E. The second edge 158 and the third edge 162 are linear, and the first edge 152 is non-linear (i.e., curved, arcuate, etc.). In other words, the fins 144A-144E and 148A-148E have a non-linear profile (i.e., the first edge 152 is non-linear) and a linear loft (i.e., the second and third edge 158, 162 are linear). In the illustrated embodiment, a portion of the fin 144A contacts and is integrally formed with a portion of the fin 144B. Specifically, a corner 206 on the fin 144A contacts and is connected to a corner 210 on the fin 144B. Likewise, a corner 214 on the fin 144B contacts and is connected to a corner 218 on the fin 144C.

With reference to FIG. 11, a mixer element 222 similar to the mixer element 58 is illustrated with similar reference numerals from the mixer element 58 used to describe the mixer element 222. Only the differences between the mixer element 222 and the mixer element 58 described herein. None of the fins 144A-144E and 148A-148E extend co-planar to any one of the dividing walls 96A-96E. In other words, the upstream fins 144A-144E and the downstream fins 148A-148E extend at angles with respect to the dividing walls 96A-96E. The first edge 152 is linear and the second edge 158 and the third edge 162 are non-linear (i.e., curved, arcuate, etc., and). In other words, the fins 144A-144E and 148A-148E have a linear profile (i.e., the first edge 152 is linear) and a non-linear loft (i.e., the second and third edge 158, 162 are non-linear). In the illustrated embodiment, a portion of the fin 144A contacts and is integrally formed with a portion of the fin 144B. Specifically, a corner 226 on the fin 144A contacts a corner 230 on the fin 144B. Likewise, a corner 234 on the fin 144B contacts a corner 238 on the fin 144C. In some embodiments, all of the edges 152, 158, 162 of any one of the fins 144A-144E and 148A-148E are non-linear creating fins with both non-linear profiles and non-linear lofts.

With reference to FIGS. 12 and 13, a mixer element 242 similar to the mixer element 58 is illustrated with similar reference numerals from the mixer element 58 used to describe the mixer element 242. Only the differences between the mixer element 242 and the mixer element 58 described herein. The upstream fins 144A-144E and the downstream fins 148A-148E extend at angles with respect to the dividing walls 96A-96E. The edges 152, 158, 162 of the fins 144A-144E and 148A-148E are linear. Each of the fins 144A-144E and 148A-148E includes multi-planar sides. For example, a first side 246 of the fin 144A includes a first planar side surface 250 and a second planar side surface 254. A portion of the second planar surface 254 is positioned between the first planar side surface 250 and the dividing wall 96A. Likewise, a second side 258 of the fin 144A includes a first planar side surface 262 and a second planar side surface 266. In other words, each of the sides 246 and 258 of the fin 144A includes more than one planar surface (i.e., first and second planar side surfaces 250, 254 and 262 and 266).

With reference the various embodiments of FIGS. 5-12, the shape and geometry of the fins 144A-144E and 148A-148E are optimized to provide improved mixing results. Added curvature to the profile and loft of the fins 144A-144E and 148A-148E can result in reduced streaking and a reduction in the total pressure loss across the mixer element, respectively.

Figure 14:
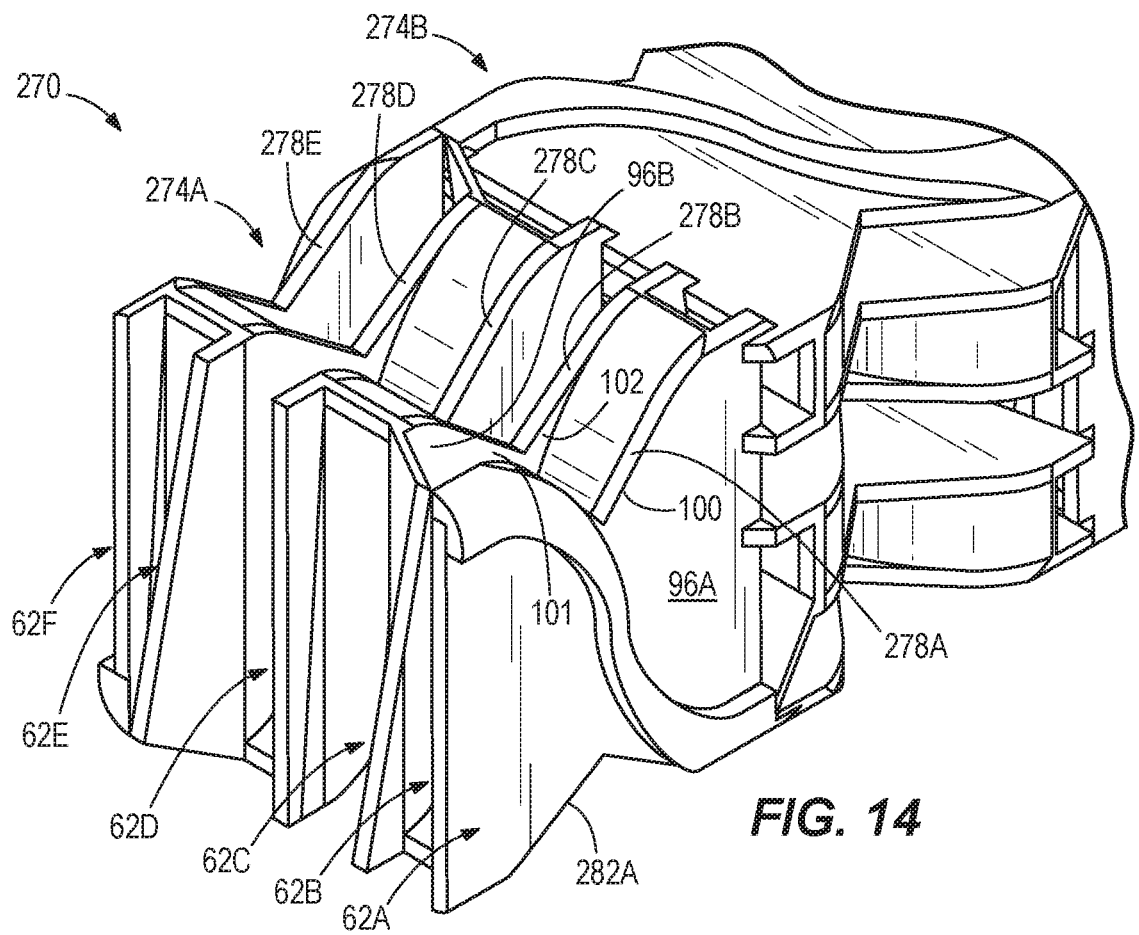
FIG. 14 is a partial perspective view of a mixer assembly according to another aspect of the disclosure.
Figure 15:
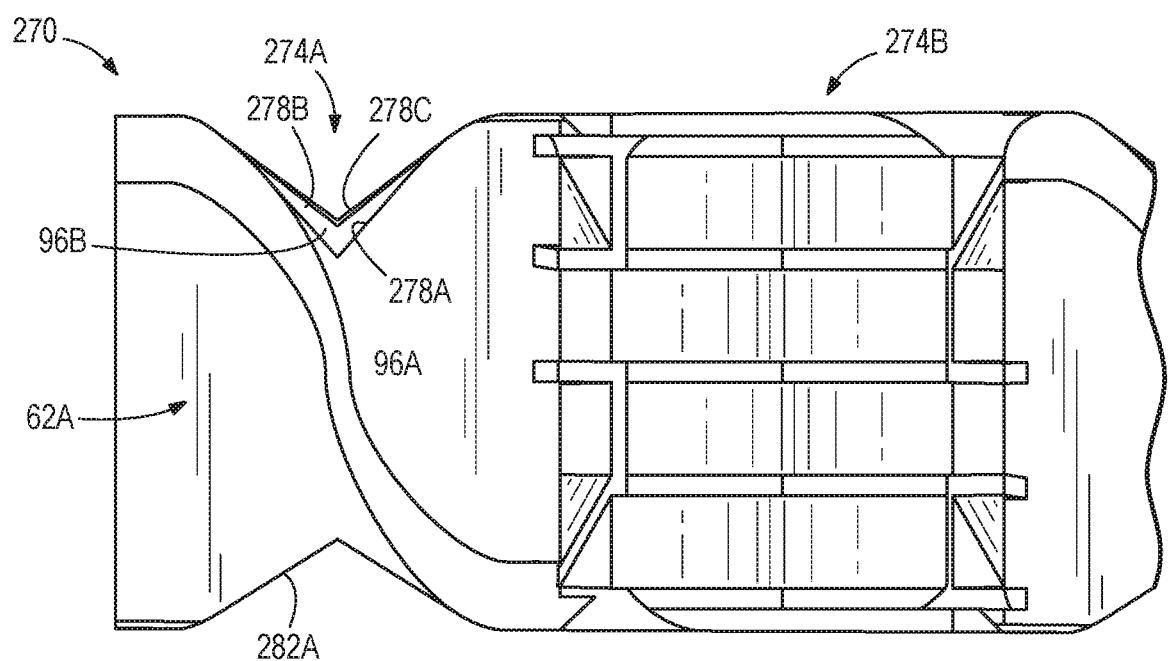
FIG. 15 is a partial side view of the mixer assembly of FIG. 14.

With reference to FIGS. 14 and 15, a mixer assembly 270 is illustrated with a first mixer element 274A and a second mixer element 274B. The mixer element 274A is similar to the mixer element 58 and is illustrated with similar reference numerals from the mixer element 58 used to describe the mixer element 274A. Only the differences between the mixer element 274A and the mixer element 58 described herein. The mixer element 274A includes a plurality of inlet channels 62A-62F including a first inlet channel 62A, a second inlet channel 62B, and a third inlet channel 62C. The mixer element 274A also includes corresponding outlet channels 68A-68F aligned with the inlet channels 62A-62F. A first dividing wall 96A is positioned between the first inlet channel 62A and the second inlet channel 62B and a second dividing wall 96B is positioned between the second inlet channel 62B and the third inlet channel 62C.

The mixer element 274A includes a first set of openings 278A-278E (i.e., upper openings) and a second set of openings 282A-282E (i.e., lower openings). The first opening 278A is formed in the first dividing wall 96A. The first opening 278A is in fluid communication with the first inlet channel 62A. Specifically, the first opening 278A is positioned between and fluidly communicates the first inlet channel 62A and the second outlet channel 68B. The second opening 278B is formed in the second dividing wall 96B. The second opening 278B is in fluid communication with the second inlet channel 62B. Specifically, the second opening 278B is positioned between and fluidly communicates the second inlet channel 62B and the third outlet channel 68C. The first opening 278A and the second opening 278B are not the same size. In the illustrated embodiment, the first opening 278A is larger than the second opening 278B. In addition, the second opening 278B is larger than the third opening 278C. In the illustrated embodiment, the second opening 278B is the same size as the fourth opening 278D and the first opening 278A is the same size as the fifth opening 278E. The first opening 278A and the second opening 278B are aligned along an axis 84. In the illustrated embodiment, the axis 84 passes through all the upper openings 278A-278E and a second axis 88 passes through all the lower openings 282A-282E.

With continued reference to FIGS. 14 and 15, the first dividing wall 96A includes a flange 100 that at least partially defines the first opening 278A. The second dividing wall 96B also includes a flange 100 that at least partially defines the second opening 278B. The first opening 278A and the second opening 278B are triangular shaped. Each of the flanges 100 includes two linear portions 101, 102 that are themselves triangular shaped. In some embodiments, the flange 100 is non-linear. In other embodiments, the first opening 278A and the second opening 278B are not the same shape or the flanges 100 that at least partially define the openings 278A, 278B are different shapes.

Although the disclosure has been described in detail with reference to certain embodiments above, variations and modifications exist within the scope and spirit of one or more independent aspects of the disclosure as described.

What is claimed is:

1. A static mixer comprising:
a first inlet channel;
a second inlet channel;
a dividing wall between the first inlet channel and the second inlet channel;
a first outlet channel aligned with the first inlet channel along a first axis;
a second outlet channel aligned with the second inlet channel along a second axis; wherein the dividing wall is between the first outlet channel and the second outlet channel;
an opening formed in the dividing wall; wherein the opening is in fluid communication with the first inlet channel and the second outlet channel; and
a fin extending from the dividing wall; wherein the fin partially blocks a flow of material to the first inlet channel or the fin partially blocks a flow of material from the first outlet channel.

2. The static mixer of claim 1, wherein the fin includes a first edge and a second edge, the second edge is coupled to the dividing wall.

3. The static mixer of claim 2, wherein the fin includes a third edge coupled to the dividing wall.

4. The static mixer of claim 2, wherein the first edge is linear and the second edge is linear.

5. The static mixer of claim 2, wherein the first edge is linear and the second edge is non-linear.

6. The static mixer of claim 2, wherein the first edge is non-linear and the second edge is linear.

7. The static mixer of claim 2, wherein the first edge is non-linear and the second edge is non-linear.

8. The static mixer of claim 1, wherein the fin defines a side with a first planar surface and a second planar surface.

9. The static mixer of claim 1, further including a guide wall at least partially defining the first inlet channel.

10. The static mixer of claim 9, wherein the guide wall is non-planar.

11. The static mixer of claim 10, wherein the guide wall has a first thickness and a second thickness different than the first thickness.

12. The static mixer of claim 11, wherein an upstream portion of the guide wall defines the first thickness and a midstream portion of the guide wall defines the second thickness; and wherein the first thickness is larger than the second thickness.

13. The static mixer of claim 1, wherein the opening is at least partially defined by a flange.

14. A static mixer including
a first inlet channel;
a second inlet channel;
a third inlet channel;
a first dividing wall positioned between the first inlet channel and the second inlet channel;
a second dividing wall positioned between the second inlet channel and the third inlet channel;

a first fin extending from the first dividing wall; and
a second fin extending from the second dividing wall;
wherein the first fin partially blocks a flow of material to the first inlet channel; and wherein the second fin is co-planar with the second dividing wall.

15. The static mixer of claim 14, further comprising a first outlet channel aligned with the first inlet channel along a first axis; a second outlet channel aligned with the second inlet channel along a second axis; and a third outlet channel aligned with the third inlet channel along a third axis; and
wherein the first dividing wall is between the first outlet channel and the second outlet channel; and wherein the second dividing wall is between the second outlet channel and the third outlet channel.

16. The static mixer of claim 15, further comprising a third fin extending from the first dividing wall; and a fourth fin extending from the second dividing wall.

17. The static mixer of claim 16, wherein the third fin partially blocks a flow of material from the first outlet channel; and wherein the fourth fin is co-planar with the second dividing wall.

18. The static mixer of claim 17, wherein the first fin includes a first edge, a second edge, and a third edge; wherein the second edge and the third edge are coupled to the first dividing wall; and wherein the first edge, the second edge, and the third edge are linear.

19. The static mixer of claim 14, further comprising a first opening formed in the first dividing wall and in fluid communication with the first inlet channel; and a second opening formed in the second dividing wall and in fluid communication with the second inlet channel; and wherein the first opening and the second opening are not the same size.

20. The static mixer of claim 14, further comprising a housing; and wherein the first inlet channel defines a first dimension that is the distance between the first dividing wall and the housing; and the second inlet channel defines a second dimension that is the distance between the first dividing wall and the second dividing wall; and wherein the first dimension is less than half the second dimension.

\* \* \* \* \*